(12) United States Patent
Wan et al.

(10) Patent No.: US 12,055,754 B2
(45) Date of Patent: Aug. 6, 2024

(54) OPTICAL SPLICING STRUCTURE, MANUFACTURING METHOD THEREOF AND SPLICING DISPLAY DEVICE

(71) Applicant: HKC CORPORATION LIMITED, Shenzhen (CN)

(72) Inventors: Ye Wan, Shenzhen (CN); Baohong Kang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 17/971,877

(22) Filed: Oct. 24, 2022

(65) Prior Publication Data
US 2023/0140296 A1    May 4, 2023

(30) Foreign Application Priority Data

Oct. 29, 2021    (CN) .......................... 202111266989.7

(51) Int. Cl.
*G02B 6/08*      (2006.01)
*G02B 6/255*    (2006.01)

(52) U.S. Cl.
CPC .............. *G02B 6/08* (2013.01); *G02B 6/2555* (2013.01); *G02B 6/2558* (2013.01)

(58) Field of Classification Search
None
See application file for complete search history.

(56) References Cited

U.S. PATENT DOCUMENTS

| | | | | |
|---|---|---|---|---|
| 5,129,028 A | * | 7/1992 | Soltan | G02B 6/08 385/115 |
| 5,251,280 A | * | 10/1993 | Asada | G09F 9/35 385/115 |
| 5,465,315 A | * | 11/1995 | Sakai | G09F 9/305 385/116 |

(Continued)

FOREIGN PATENT DOCUMENTS

| CN | 2077623 U | 5/1991 |
|---|---|---|
| CN | 106556948 A | 4/2017 |

(Continued)

OTHER PUBLICATIONS

First Office Action issued in counterpart Chinese Patent Application No. 202111266989.7, dated Dec. 3, 2021.

(Continued)

*Primary Examiner* — Jerry Rahll
(74) *Attorney, Agent, or Firm* — Westbridge IP LLC

(57) ABSTRACT

Disclosed are an optical splicing structure, a method for manufacturing the optical splicing structure and a splicing display device. The optical splicing structure is provided at the splice position of two display panels, the optical splicing structure includes a plastic sealing body and an optical fiber bundle, the plastic sealing body includes an incident end and a light emitting end opposite to the incident end; the optical fiber bundle includes a plurality of optical fiber lines distributed in the plastic sealing body; a plurality of the optical fiber lines extend in the direction of the incident end to the light emitting end and are arranged in a direction perpendicular to the direction from the incident end to the light emitting end.

6 Claims, 7 Drawing Sheets

(56) References Cited

U.S. PATENT DOCUMENTS

| | | | | |
|---|---|---|---|---|
| 5,479,550 | A * | 12/1995 | Nishioka | C03B 37/15 385/116 |
| 5,502,457 | A * | 3/1996 | Sakai | G02F 1/133524 385/116 |
| 5,572,034 | A * | 11/1996 | Karellas | G01T 1/2928 385/115 |
| 6,999,138 | B2 * | 2/2006 | Cok | H10K 59/18 345/1.3 |
| 8,690,414 | B2 * | 4/2014 | Tomotoshi | H01J 11/44 362/616 |
| 8,907,863 | B2 * | 12/2014 | Li | H04N 9/12 345/1.1 |
| 10,143,094 | B2 * | 11/2018 | Chin | G02B 6/00 |
| 10,660,220 | B2 * | 5/2020 | Chin | G02B 6/0078 |
| 11,092,835 | B2 * | 8/2021 | Asamizu | G02F 1/133615 |
| 11,216,236 | B2 * | 1/2022 | Oh | G02B 6/1223 |
| 11,247,421 | B1 * | 2/2022 | Gulgunje | B29D 11/00663 |
| 2003/0234343 | A1 * | 12/2003 | Cok | H01L 27/14603 348/E5.135 |
| 2006/0007054 | A1 * | 1/2006 | Chang | G02F 1/133524 345/1.3 |
| 2017/0094814 | A1 * | 3/2017 | Chin | H05K 5/0017 |
| 2019/0318669 | A1 * | 10/2019 | Wu | G09F 9/3026 |
| 2020/0133614 | A1 * | 4/2020 | Oh | G06F 3/1446 |

FOREIGN PATENT DOCUMENTS

| | | |
|---|---|---|
| CN | 108279737 A | 7/2018 |
| CN | 109785753 A | 5/2019 |
| CN | 110364076 A | 10/2019 |
| CN | 113160714 A | 7/2021 |
| CN | 213844611 U | 7/2021 |

OTHER PUBLICATIONS

Fourth Office Action issued in counterpart Chinese Patent Application No. 202111266989.7, dated Jul. 22, 2022.

Refusal Decision issued in counterpart Chinese Patent Application No. 202111266989.7, dated Sep. 19, 2022.

Second Office Action issued in counterpart Chinese Patent Application No. 202111266989.7, dated Dec. 24, 2021.

Third Office Action issued in counterpart Chinese Patent Application No. 202111266989.7, dated Mar. 3, 2022.

* cited by examiner

OPTICAL SPLICING STRUCTURE, MANUFACTURING METHOD THEREOF AND SPLICING DISPLAY DEVICE

CROSS-REFERENCE TO RELATED APPLICATIONS

This application claims priority to Chinese Patent Application No. 202111266989.7, filed on Oct. 29, 2021, the entire contents of which are incorporated herein by reference.

TECHNICAL FIELD

The present application relates to the field of splicing display technology, and in particular to an optical splicing structure, a manufacturing method thereof and a splicing display device.

BACKGROUND

Currently, the splicing display industry is booming to achieve a larger display area. Understandably, the splicing screen is made of at least two displays by physical splicing, because each display is independent, with its own independent plastic sealing, the display device of flat display panel can only achieve narrower border, but difficultly achieve seamless splicing, and the display device of curved display is also difficult to avoid the concave and black boarder of splicing.

SUMMARY

The main purpose of the present application is to provide an optical splicing structure, by transmitting the display light of the display panel to a splice gap between two display panels, where the display of the screen can be achieved, to solve the problem of concave and black boarder at the splice position of the splicing display panels, to achieve seamless splicing.

In order to achieve the above purpose, the present application provides an optical splicing structure, applied to a splicing display device, the splicing display device including at least two display panels, the optical splicing structure being provided at a splice position of two display panels, wherein the optical splicing structure includes:
  a plastic sealing body including an incident end and a light emitting end opposite to the incident end;
  an optical fiber bundle including a plurality of optical fiber lines distributed within the plastic sealing body; and
  wherein the plurality of optical fiber lines extend in an extension direction from the incident end to the light emitting end and arranged in a direction perpendicular to the extension direction from the incident end to the light emitting end.

In an embodiment, the plastic sealing body includes a main body and opaque particles filled within the main body.

In an embodiment, the optical fiber lines are made of glass or organic fibers; and/or,
  the main body is made of acrylonitrile-butadiene-styrene plastic, UV-curable ink, polymethyl methacrylate or polycarbonate; and/or,
  the opaque particles are made of carbon black.

In an embodiment, the optical fiber line is curved in the extension direction, an end of the optical fiber line at the incident end is perpendicular to an outer surface of the incident end, and the end of the optical fiber line at the light emitting end is perpendicular to a surface of the light emitting end.

In an embodiment, the incident end includes an incident portion and a fixing portion;
  two incident portions are provided on two sides of the fixing portion respectively, each incident portion is provided in a concave arc; or,
  the fixing portion and the incident portion are arranged in the direction from the light emitting end to the incident end, the fixing portion is provided with two fixing slots that are away from each other, a line for connecting the two fixing slots is perpendicular to the direction from the light emitting end to the incident end, and a surface of the incident portion away from the fixing portion is flat.

In an embodiment, the plurality of the optical fiber lines are symmetrical about a midline in a direction of their arrangement.

In an embodiment, the optical fiber line comprises a fiber core, a cladding layer and a coating layer provided in sequence from inside to outside, and the coating layer is a light sparse material.

The present application also provides a method for manufacturing an optical splicing structure, including:
  suspending a plurality of optical fiber lines above a mold and laying the optical fiber lines along an inner wall surface of the mold;
  filling the mold with a plastic sealing liquid and curing into a plastic sealing body; and
  cutting into the optical splicing structure.

The present application also provides a splicing display device, includes at least two display panels and the optical splicing structure, wherein the optical splicing structure is located at a splice position of two adjacent display panels, the light emitting end covers at least a non-display area of two display panels, wherein the optical splicing structure includes:
  a plastic sealing body including an incident end and a light emitting end opposite to the incident end;
  an optical fiber bundle including a plurality of optical fiber lines distributed within the plastic sealing body; and
  wherein the plurality of optical fiber lines extend in an extension direction from the incident end to the light emitting end and arranged in a direction perpendicular to the extension direction from the incident end to the light emitting end.

In an embodiment, the splicing display device further includes a support assembly, the support assembly is provided on a surface of the display panel away from the light emitting end, the incident end passes through the two display panels to fixedly connect to the support assembly.

In an embodiment, the plastic sealing body includes a main body and opaque particles filled within the main body.

In an embodiment, the optical fiber lines are made of glass or organic fibers; and/or,
  the main body is made of acrylonitrile-butadiene-styrene plastic, UV-curable ink, polymethyl methacrylate or polycarbonate; and/or,
  the opaque particles are made of carbon black.

In an embodiment, the optical fiber line is curved in the extension direction, an end of the optical fiber line at the incident end is perpendicular to an outer surface of the incident end, and the end of the optical fiber line at the light emitting end is perpendicular to a surface of the light emitting end.

In an embodiment, the incident end includes an incident portion and a fixing portion;

two incident portions are provided on two sides of the fixing portion respectively, each incident portion is provided in a concave arc; or, the fixing portion and the incident portion are arranged in the direction from the light emitting end to the incident end, the fixing portion is provided with two fixing slots that are away from each other, a line for connecting the two fixing slots is perpendicular to the direction from the light emitting end to the incident end, and a surface of the incident portion away from the fixing portion is flat.

In an embodiment, the plurality of the optical fiber lines are symmetrical about a midline in a direction of their arrangement.

In the technical solution of the present application, the optical splicing structure includes a plastic sealing body and an optical fiber bundle, a plurality of optical fiber lines of the optical fiber bundle are distributed within the plastic sealing body, the plastic sealing body provides a fixed base to enable the optical fiber lines to have a specific extension direction, i.e., a specific optical route. The plurality of optical fiber lines extend in an extension direction from the incident end to the light emitting end, which can receive the light from the incident end and transmit the light to the light emitting end, and are distributed perpendicular to the direction from the incident end to the light emitting end, i.e., in the direction of horizontally connecting two display panels, so that the light emitting end also forms a certain display screen, which can cover the black edge or concave at the splice position of two display panels, to achieve seamless splicing. The optical fiber line has low loss in optical transmission, which can effectively ensure the display screen at the light emitting end to improve the effect of seamless splicing.

BRIEF DESCRIPTION OF THE DRAWINGS

In order to more clearly illustrate the technical solutions in the embodiments of the present application or in the prior art, the following briefly introduces the drawings in the description of the embodiments or the prior art. Obviously, the drawings in the following description are only some embodiments of the present application. Those skilled in the art, other drawings can also be obtained based on the structures shown in these drawings without any creative effort.

DETAILED DESCRIPTION OF THE EMBODIMENTS

Figure 1:
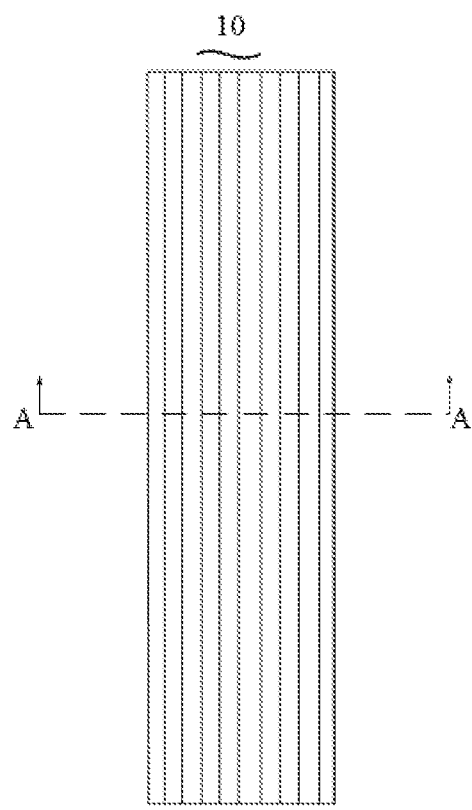
FIG. 1 is a first top view of an optical splicing structure according to an embodiment of the present application.

The technical solutions in the embodiments of the present application will be clearly and completely described below with reference to the drawings of the present application. Obviously, the described embodiments are only a part of the embodiments of the present application, but not all of the embodiments. Based on the embodiments in the present application, all other embodiments obtained by those skilled in the art without creative work fall within the scope of the present application.

It should be noted that if there is a directional indication (such as up, down, left, right, front, rear • • •) in the embodiments of the present application, the directional indication is only used to explain the relative positional relationship, movement, etc. of the components in a certain posture (as shown in the drawings). If the specific posture changes, the directional indication will change accordingly.

In the present application, unless otherwise clearly specified and limited, the terms "connected", "fixed", etc. should be interpreted broadly. For example, "fixed" can be a fixed connection, a detachable connection, or a whole; can be a mechanical connection or an electrical connection; may be directly connected, or indirectly connected through an intermediate medium, and may be the internal communication between two elements or the interaction relationship between two elements, unless specifically defined otherwise. For those of ordinary skill in the art, the specific meaning of the above-mentioned terms in the present application can be understood according to specific circumstances.

It should be noted that, the descriptions associated with, e.g., "first" and "second" in the present application are merely for descriptive purposes, and cannot be understood as indicating or suggesting relative importance or impliedly indicating the number of the indicated technical feature. Therefore, the feature associated with "first" or "second" can expressly or impliedly include at least one such feature. In addition, the technical solutions between the various embodiments can be combined with each other, but they must be based on the realization of those skilled in the art. When the combination of technical solutions is contradictory or cannot be achieved, it should be considered that such a combination of technical solutions does not exist, nor is it within the scope of the present application.

The present application proposes an optical splicing structure applied to a splicing display device, the splicing display device includes at least two display panels, the optical splicing structure are provided at a splice position of two display panels to achieve seamless connection.

Referring to FIGS. 1 to 4, in some embodiments under the general technical concept of the present application, the optical splicing structure 10 includes a plastic sealing body 11 and an optical fiber bundle 13, the plastic sealing body 11 includes an incident end 113 and a light emitting end 111 opposite to the incident end 113. The optical fiber bundle 13 includes a plurality of optical fiber lines 131 distributed inside the plastic sealing body 11. The plurality of the optical fiber lines 131 extend in an extension direction from the incident end 113 to the light emitting end 111 and are arranged in a direction perpendicular to the extension direction from the incident end 113 to the light emitting end 111.

In the embodiment, the optical splicing structure 10 is used for the splicing of two display panels 30 and is capable of achieving certain optical transmission effects, the display panel 30 can be a display panel 30 of a rigid liquid crystal display device (LCD), or a flexible organic light-emitting diode (OLED) display panel 30.

In some embodiment, the optical splicing structure 10 includes a plastic sealing body 11 and an optical fiber bundle 13 disposed within the plastic sealing body 11, which is understood to be a base that fixes the optical fiber bundle 13. The plastic sealing body 11 needs to fill the gap between two display panels 30. The plastic sealing body 11 is thus roughly strip shape and extends in the extension direction of a docking side of the two display panels 30 and extends laterally in a width of the gap between the two display panels 30. The plastic sealing body 11 has a certain thickness in the thickness direction of the display panel 30 to facilitate the fixation, and the thickness direction of the plastic sealing body 11 is also the extension direction of the incident end 113 to the light emitting end 111. The optical fiber bundle 13 contains a plurality of optical fiber lines 131, and the plurality of optical fiber lines 131 can be distributed side by side or spaced apart on the lateral surface where the plastic sealing body 11 is located, without limitation herein. Each optical fiber line 131 extends in the direction from the incident end 113 to the emitting end 111, to realize the light transmission. The light emitting end 111 is also the same as the emitting side of the display panel 30, which is used to face the user to display the screen.

The optical splicing structure 10 of the technical solution of the present application includes a plastic sealing body 11 and an optical fiber bundle 13 with a plurality of optical fiber lines 131 distributed in the plastic sealing body 11, which provides a fixed base to enable the optical fiber lines 131 to have a specific extension direction, i.e., a specific optical route. The plurality of optical fiber lines 131 extend in the extension direction from the incident end 113 to the light emitting end 111, and can receive the light from the incident end 113 and transmit the light to the light emitting end 111, and are distributed in a direction perpendicular to the direction from the incident end 113 to the light emitting end 111, i.e. in the direction of the lateral connection of the two display panels 30, so that the light emitting end 111 also forms a certain display screen. The light emitting 111 can cover the black edge 33 or the concave at the splice position of the two display panels 30, to achieve a seamless splicing effect. The optical fiber line 131 has low loss in optical transmission and can effectively ensure the display screen of the light outlet 111 to improve the effect of seamless splicing.

In order to better achieve the function of the optical fiber line 131, in the some embodiments, the plastic sealing body 11 includes a main body and opaque particles filled within the main body.

In the embodiment, the main body is generally made of plastic for the plastic sealing, i.e., it is in liquid form before the plastic sealing, and when loaded into the mold 200 for curing under special conditions, it can fix the fiber bundle 13 and ensure the fixed optical path of the optical fiber line 131. Here, the material of the main body can be at least one of acrylonitrile-butadiene-styrene plastic (ABS), ultraviolet curing ink (UV ink), polymethyl methacrylate (PMMA) and polycarbonate (PC), all of the above materials are light sparse media relative to the optical fiber line 131, which can effectively reduce the refraction of light in this material, to reduce the emitting of the light shot along other angles and ensure transmission stability of the light along the optical fiber line 131, and the stable performance of the material of the main body can protect the fiber line 131 better. The main body is doped with opaque particles, which can be made of carbon black, so that the overall light transmission of the plastic sealing body 11 is lower and light leakage is further reduced. In other embodiments, the material of the opaque particles can also be ferrous metal particles, etc.

Figure 5:
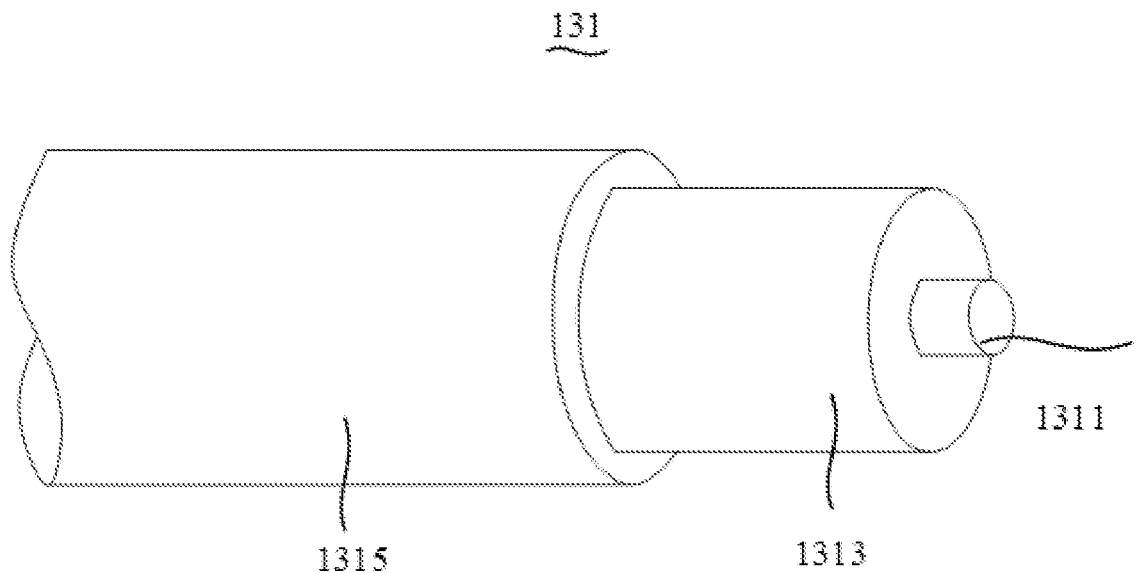
FIG. 5 is a schematic structural view of the optical fiber line in the optical splicing structure according to the embodiment of the present application.
Figure 6:
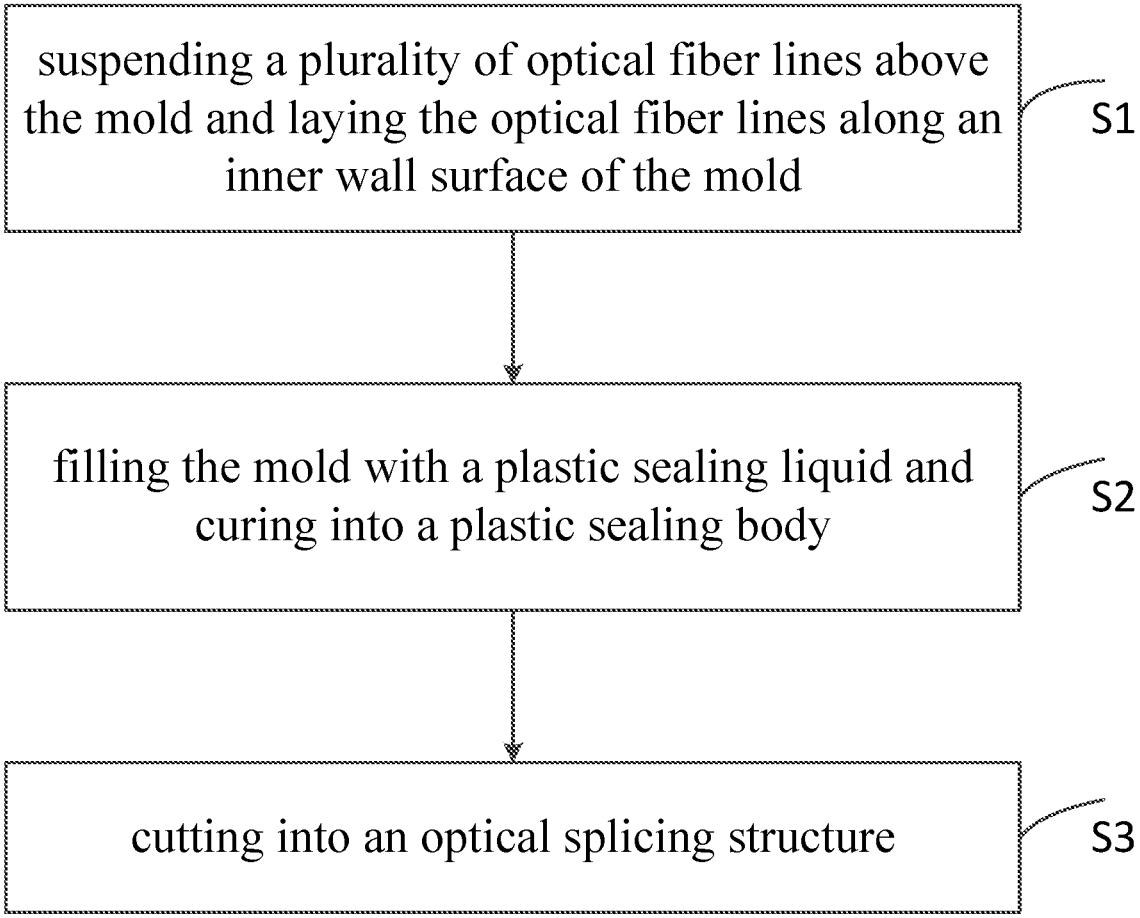
FIG. 6 is a flowchart of a method for manufacturing an optical splicing structure according to the embodiment of the present application.

In order to ensure the optical transmission performance of the optical fiber line 131, in some embodiments, the material of the optical fiber line 131 is glass fiber or organic fiber, the glass fiber has good high temperature resistance, and good tensile strength and corrosion resistance, to effectively improve the structural stability and service life of the optical fiber line 131, and the glass fiber has a good light transmission effect. And the organic fiber has better flexibility, which can improve the performance of the optical fiber line 131. To further improve the structural performance of optical fiber line 131, please refer to FIG. 5, the optical fiber line 131 includes a fiber core 1311, a cladding layer 1313 and a coating layer 1315 provided sequentially from inside to outside, and the coating layer 1315 is a light sparse material. Here, the fiber core 1311 is a high refractive index glass fiber, which plays the main role of light transmission, and the material of the cladding layer 1313 is a low refractive index silica glass, which plays a certain role of protection and fixed molding for the glass fiber. The coating layer 1315 is a light sparse material, i.e., various plastics or resins mentioned above, with high structural strength and good corrosion resistance, which can effectively improve the strength and structural stability of the optical fiber line 131, and it can also avoid the influence of the plastic sealing body 11 on the fiber core 1311.

Figure 2:
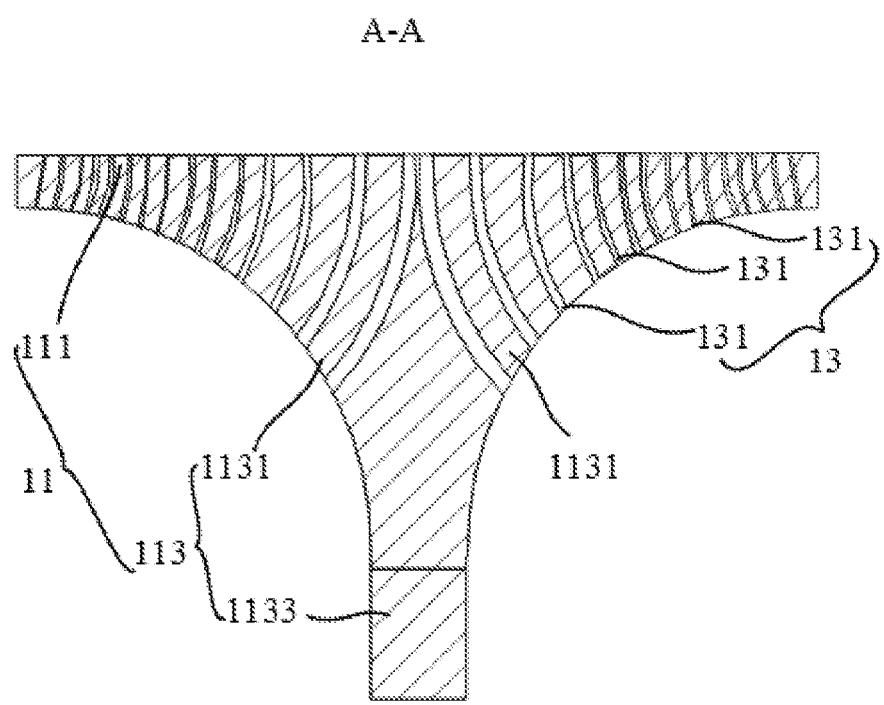
FIG. 2 is a sectional view along line A-A in FIG. 1.
Figure 3:
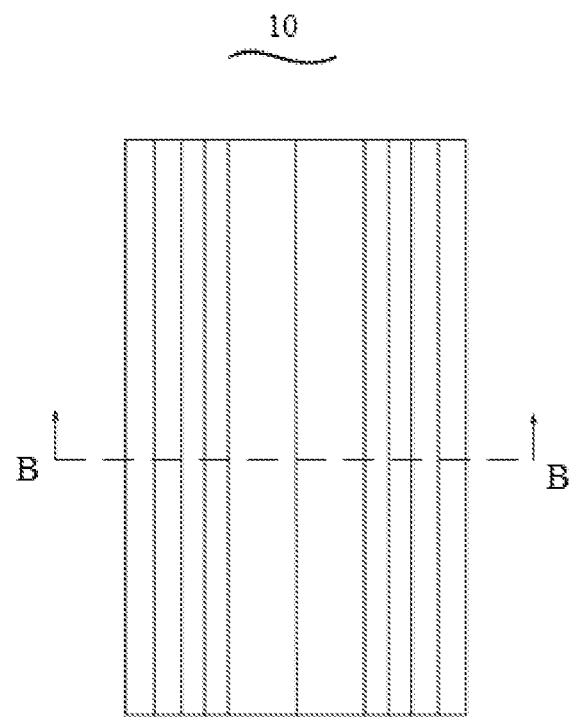
FIG. 3 is a second top view of the optical splicing structure according to the embodiment of the present application.
Figure 4:
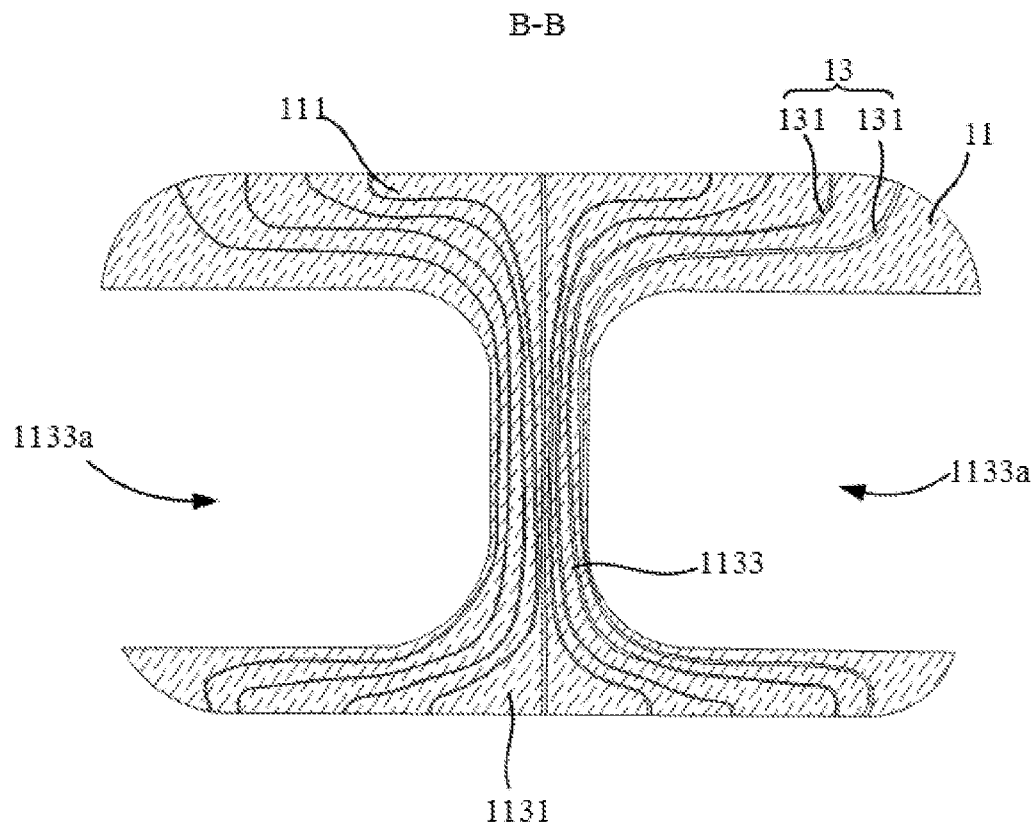
FIG. 4 is a cross-sectional view along line B-B in FIG. 3.

Referring further to FIGS. 2 and 4, in some embodiments, the optical fiber line 131 is curved in the extension direction, the end of the optical fiber line 131 at the incident end 113 is perpendicular to the outer surface of the incident end 113, and the end of the optical fiber line 131 at the light emitting end 111 is perpendicular to the surface of the light emitting end 111.

In the embodiment, in order to make the light emitting end 111 better cover the gap between the two display panels 30, the area of the light emitting end 111 will generally be larger than the gap between the two display panels 30, and in order to fix the plastic sealing body 11, its structure passing through the two display panels 30 needs to be adapted to the gap between the two display panels 30, so that the width of the plastic sealing body 11 varies significantly in the extension direction from the incident end 113 to the light emitting end 111 of the plastic sealing body 11, and in order to ensure the optical transmission performance of the optical fiber line 131, one end of the optical fiber line 131 is placed perpendicular to the outer surface of the incident end 113, to better receive the display light, and to make it easier for the light to enter the optical fiber line 131 for transmission and improve the transmission effect. Similarly, the other end of the optical fiber line 131 is perpendicular to the outer surface of the light emitting end 111, which then allows light to be emitted smoothly and improves the display effect to ensure a seamless splicing of the screen of the display area 31 of the two display panels 30 and improve the visual effect. In order to ensure that both ends of the optical fiber line 131 are perpendicular to the respective end surfaces where they are located and that the widths of the two opposite end surfaces are not the same, the optical fiber line 131 is curved in the extension direction, for example, an arc or a parabola, etc., to ensure the efficiency of the incident and emitting of the light at the end, and to improve the transmission efficiency with a smooth extension direction to ensure the display effect.

Referring to FIGS. 2 and 4, in some embodiments, the incident end 113 includes an incident portion 1131 and a fixing portion 1133. Two incident portions 1131 are provided on both sides of the fixing portion 1133, each incident portion 1131 is a concave arc; or, the fixing portion 1133 and the incident portion 1131 are arranged in the direction from the light emitting end 111 to the light emitting end 113, the fixing portion 1133 is provided with two fixing slots 1133a away from each other, a line for connecting the two the fixing slots 1133a is perpendicular to the direction from the light emitting end 111 to the incident end 113, a surface of the incident portion 1131 away from the fixing portion 1133 is flat.

It should be understood that the light emitting end 111 is used for emitting light to realize the screen display. In the embodiment, the structure of the incident end 113 is different for the splicing of different display panels 30.

In FIG. 2, for example, when splicing the flexible OLED, the edges of the two flexible display panels 30 can be bent to form a curved structure, to hide part of the black edge 33 at splice position of the two. In this way, there will be part of the display area 31 between the two flexible display panels 30, and the light from the display area 31 here is directly used as the incident light of the incident portion 1131 of the optical splicing structure 10, which can effectively compact the structure and reduce the spacing therebetween. Therefore, there are two incident portions 1131, and the fixing portion 1133 is located in the middle, and the two incident portions 1131 are located on both sides of the fixing portion 1133, and fit with the display area 31 of the two display panels 30, because the display area 31 of the display panel 30 is a convex curved surface, correspondingly, the incident portion 1131 is a concave curved surface, to achieve a seamless splicing effect. In other embodiments, the surface of the incident portion 1131 can be other shapes, matching the surface of the display panel 30. Here, the fixing portion 1133 corresponds to the position of the two black edges 33 and can be fixed directly to the black edge 33. Of course, to further improve the stability and reduce the impact on the black edge 33, the two black edges 33 are spaced out with a gap, and the fixing portion 1133 is extended a distance toward the direction away from the light emitting end 111, i.e., toward the back of the display panel 30, to be connected correspondingly with the component fixing the display panel 30 to ensure a stable mounting structure. The connection method here can be bonding, snap connection, etc., and will not be limited here.

In FIG. 4, for the splicing of the rigid LCD, because the two adjacent rigid display panels 30 can only be spliced as a flat structure, the black edges 33 of both face each other, so when the optical splicing structure 10 is set between the two rigid display panels 30, there is no incident light at the splice position to enable the incident end 113 to receive, and because the LCD also needs to have its own backlight structure, so the back of the splice position of the two display panels 30 is set up with a corresponding strip of sub-screen 90 as the light source of the optical splicing structure 10. In this way, the incident end 113 of the optical splicing structure 10 includes a planar incident portion 1131, which reaches into the back of the two display panels 30 to fit with the sub-screen 90, to ensure a better light reception effect. In order to connect with the fixing component of the display panel 30, the fixing portion 1133 is located between the incident portion 1131 and the light emitting end 111, and a fixing slot 1133a is opened, and the openings of the two fixing slots 1133a are away from each other, and the opening of each fixing slot 1133a faces the side edge of one display panel 30, and is bonded or snap connected to the side edges of display panel 30, etc., without limitation here. The opening of the fixing slot 1133a is rectangular, matching the side edges of the display panel 30, to make the structure more compact and reduce the width at the splice position.

Referring again to FIGS. 1 and 2, in some embodiments, the plurality of the optical fiber lines 131 are symmetrical about a midline in a direction of their arrangement.

In the embodiment, in order to ensure the uniformity of the screen display, the plurality of optical fiber lines 131 are symmetrical about an axis, which is the midline of their arrangement, i.e., the midline in the direction for connecting the two display panels 30 is taken as the axis, so that the light emitting end 111 is displayed more uniformly at the splice position of the two display panels 30, to ensure the transition of the splicing of the two display areas 31 and further improve the seamless splicing effect, which will further improve the seamless splicing effect.

Please refer to FIGS. 6 to 9, the present application also proposes a method for manufacturing an optical splicing structure, the optical splicing structure 10 is an optical splicing structure 10 as described in any of the above, the method includes:

Step S1: suspending a plurality of optical fiber lines 131 above the mold 200 and laying the optical fiber lines 131 along an inner wall surface of the mold 200;

Step S2: filling the mold 200 with a plastic sealing liquid and curing into a plastic sealing body 11;

Step S3: cutting into an optical splicing structure 10.

Figure 7:
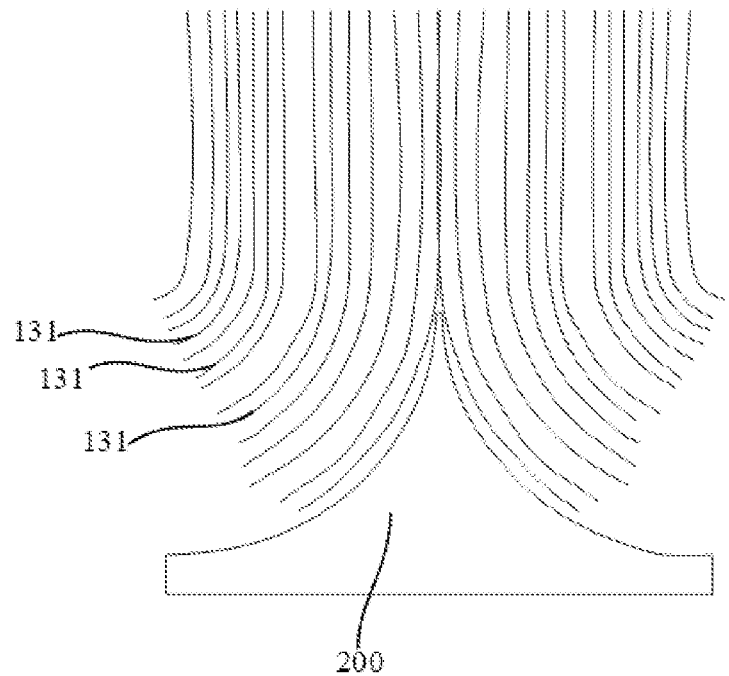
FIG. 7 is a schematic structural view of the optical splicing structure in the step S1 in the flowchart shown in FIG. 6.

Referring to FIG. 7, in the embodiment, step S1 is called draping, when hanging multiple optical fiber lines 131 above the mold 200, the optical fiber lines 131 will fall vertically into the mold 200 under the gravity, to make the optical fiber lines 131 have a specific optical path. The inner wall surface of the mold 200 can be designed, for example, when the optical fiber lines 131 are curved and extended, the inner wall surface of the mold 200 is curved, so that the lower end of the optical fiber line 131 is bent to fit the inner wall surface to complete the initial shape. For example, when the plurality of optical fiber lines 131 are provided symmetrically in the direction of their arrangement, the mold 200 has two symmetrically curved surfaces to achieve a better display effect. Specifically, the mold 200 is rectangular, and its opposite sides are provided with semi-circular arcs of concave grooves, and when the plurality of optical fiber lines 131 are hanging down, a half of the optical fiber lines 131 are bent in one direction along the groove wall of one concave groove, and the other half of the optical fiber lines 131 are bent in a backward direction along the groove wall of the other concave groove, to form a symmetrical structure of the initially shaped optical fiber bundle 13.

Figure 8:
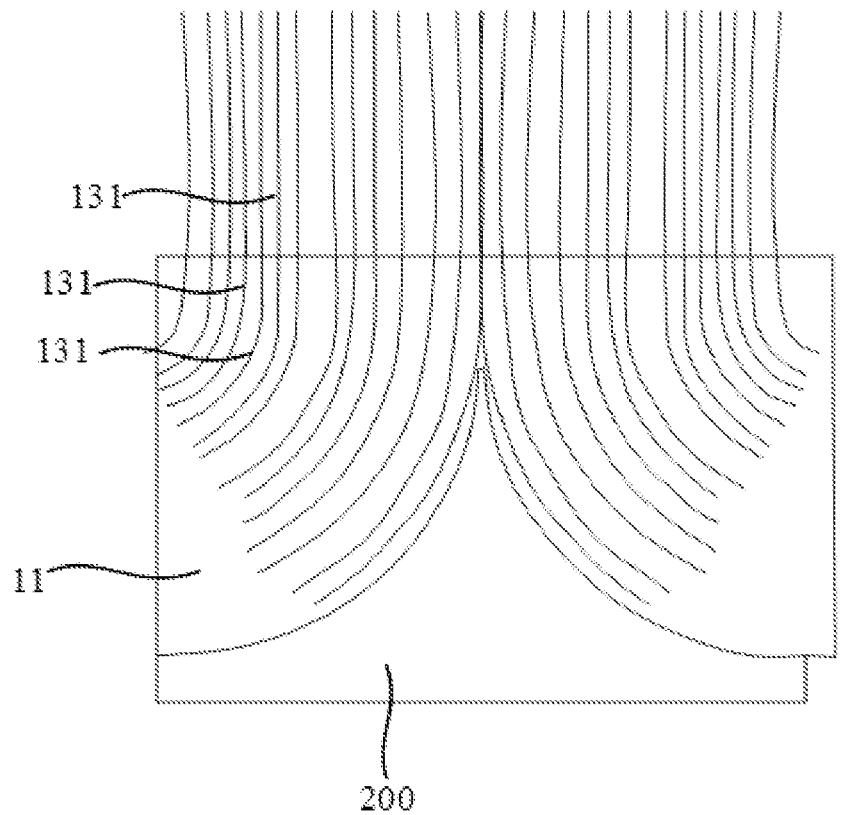
FIG. 8 is a schematic structural view of the optical splicing structure in the step S2 in the flowchart shown in FIG. 6.

Referring to FIG. 8, step S2 is called filling, where the plastic sealing liquid is filled into the mold 200, to surround the optical fiber lines 131, and under the filling effect of the liquid, the plurality of optical fiber lines 131 will be fully stretched out and can have a certain space, to allow the plurality of optical fiber lines 131 to be set at intervals in the row direction, to reduce the material used for the optical fiber lines 131 and facilitate cost control. The material of the plastic sealing liquid herein is substantially the material of the plastic sealing body 11 as in the above embodiment, i.e., the main body doped with opaque particles, and the material of the main body can be at least one of acrylonitrile-butadiene-styrene plastic (ABS), ultraviolet curable ink (UV ink), polymethyl methacrylate (PMMA), and polycarbonate (PC). The plastic sealing liquid is then cured into a solid plastic sealing body 11, which holds the optical fiber line 131 stably in place and forms a stable arc extension structure to ensure better transmission. For example, when the plastic sealing liquid is UV ink, curing can be achieved by UV light irradiation.

Figure 9:
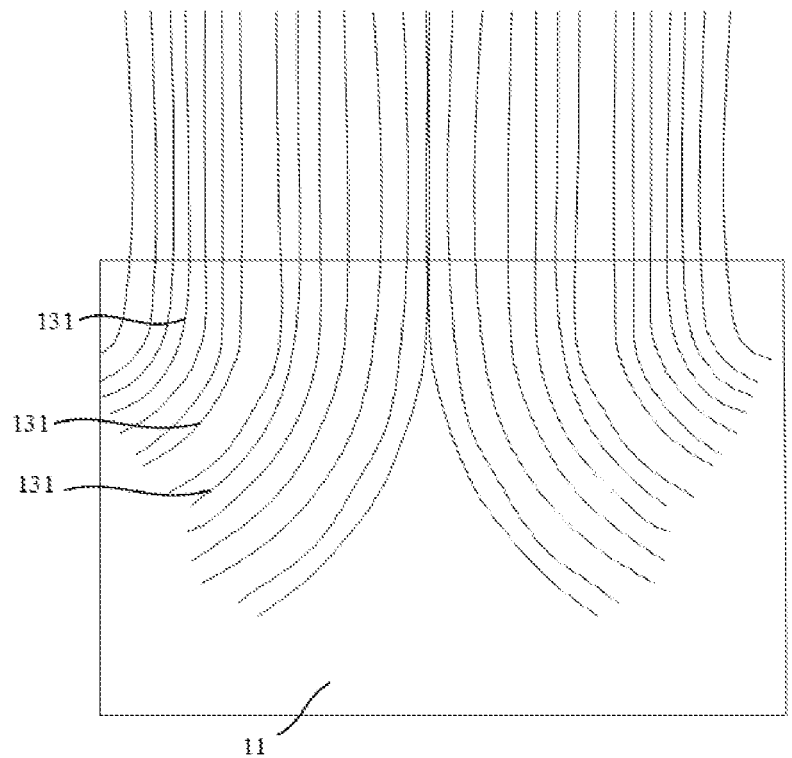
FIG. 9 is a schematic structural view of the optical splicing structure in complementary state after the step S2 in the flowchart shown in FIG. 6.
Figure 10:
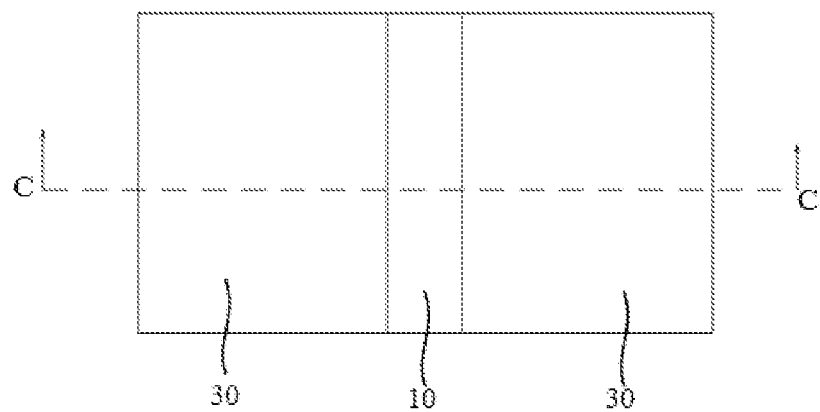
FIG. 10 is a first top view of the splicing display device according to the embodiment of the present application.

Referring to FIG. 9, when it is necessary to cooperate with the OLED display device, the middle portion of the fiber bundle 13, which is symmetrically set, extends out of the fixing portion 1133, so a second filling is also required in step S2, i.e., after removing the original mold 200, the middle position where the mold 200 is located is also filled with the plastic sealing liquid, to form the solid plastic sealing body 11.

Referring to FIG. 2, finally, the cured plastic sealing body 11 is then cut to the desired shape and matching size through the cutting in step S3. For example, the opposite sides are cut into concave curved surfaces to form the incidence portion 1131 to match the curved edges of the display panel 30 of the OLED. The fixing portion 1133 of the middle portion can be cut directly according to the size needed, or it can then be secondary molded with other materials, to lengthen the length of the fixing portion 1133 for easy fixing. Finally, the cut structure forms the optical splicing structure 10, which can be mainly used at the splice position of flexible display devices such as OLEDs to display the screen, to solve the problems such as notches or black edges at the splice position and realize seamless splicing.

Referring to FIGS. 10 to 13, the present application also proposes a splicing display device 100, the splicing display device 100 includes at least two display panels 30, and an optical splicing structure 10 as described above, the optical splicing structure 10 is located at the splice position of two adjacent display panels 30, the light emitting end 111 covers at least the non-display area 31 of two display panels 31. The structure of the optical splicing structure 10 in the splicing display device 100 of the present application is the structure of the optical splicing structure 10 as in any of the above embodiments, and therefore has the beneficial effects brought about by any of the above embodiments, which will not be repeated herein.

Figure 11:
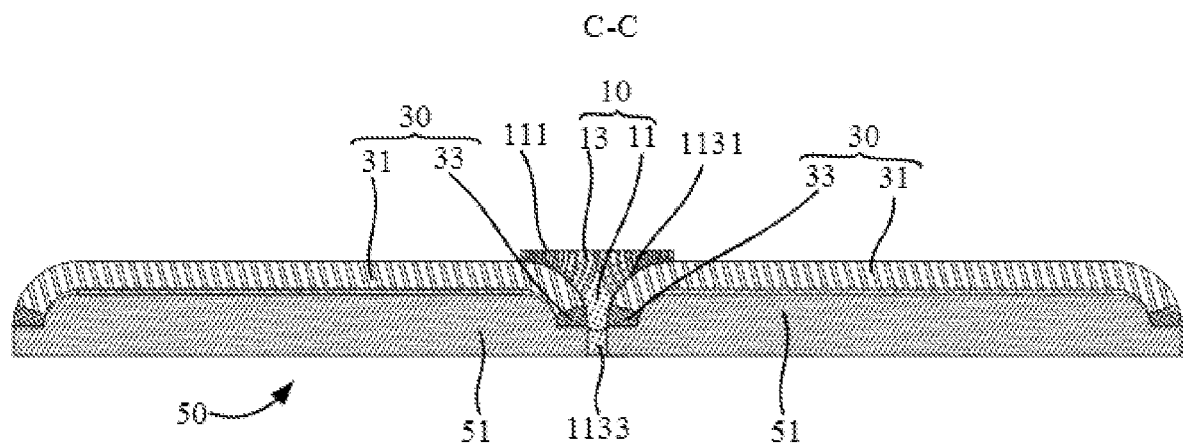
FIG. 11 is a cross-sectional view along line C-C in FIG. 10.
Figure 12:
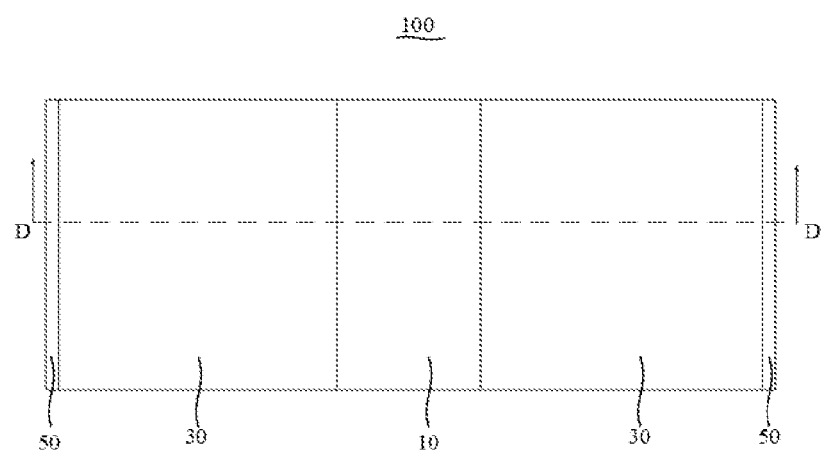
FIG. 12 is a second top view of the splicing display device according to the embodiment of the present application.

In FIG. 11, in the embodiment, when the splicing display device 100 is an OLED splicing display device 100, the optical splicing structure 10 can be installed between the two display panels 30 because the device does not require a backlight and the edges of the two display panels 30 are curved. At this time, the light emitting end 111 of the optical splicing structure 10 covers the edges of the two display panels 30, covers at least the non-display area 31 of the display panel 30, i.e., the black edge 33, and the incident portion 113 of the incident end 113 attached to the curved display area 31, so that the light from the display area 31 is transmitted to the corresponding light emitting end 111 of the non-display area 31. In order to improve the splicing effect, the edge of the light emitting end 111 is extended to the display area 31, and the size beyond the black edge 33 is less than or equal to 8 mm, for example, 7 mm, 6 mm, etc., to effectively ensure the display screen of the light emitting end 111, to improve the smoothness of the articulation and ensure the seamless splicing effect.

When the width of the light end 111 is certain, in order to improve the display effect, the thickness of the optical splicing structure 10 can also be thickened, that is, the height of the light end 111 is flush with the light surface of the display panel 30, or higher than the light emitting surface of the display panel 30, here, it should not be high too much above the light emitting surface of the display panel 30, can choose a size range of less than or equal to 5 mm, so as to ensure the light emitting effect not consume too much material and reduce cost. The optical splicing structure 10 in the splicing display device 100 is not too abrupt, to improve the overall aesthetics.

Figure 13:
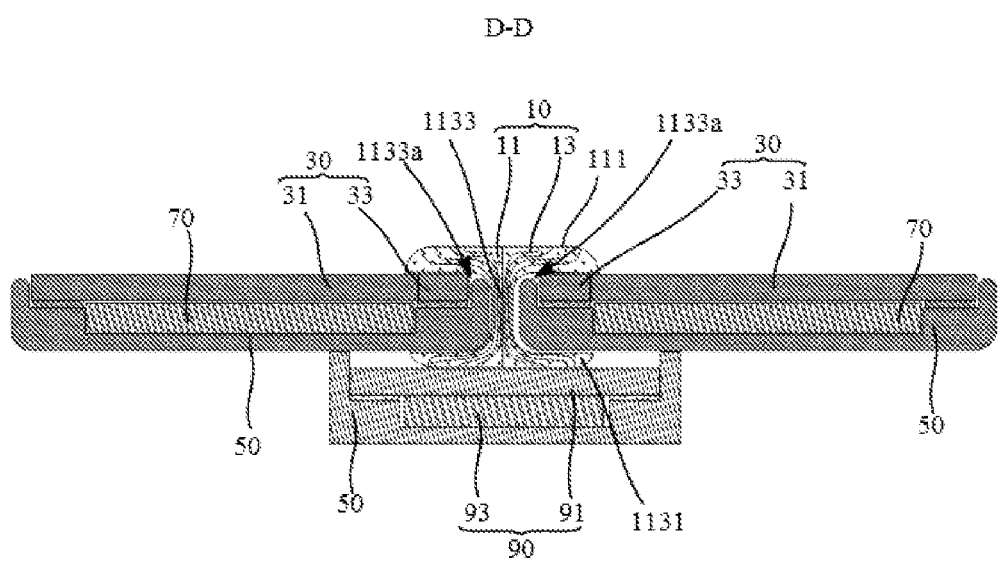
FIG. 13 is a cross-sectional view along line D-D in FIG. 12.

In FIG. 13, when the splicing display device 100 is LCD display device, the splicing display device 100 also includes a sub-screen 90 for the optical splicing structure 10 to provide a light source for display. The light emitting end 111 of the optical splicing structure 10 is set above the black edge 33 of the two display panels 30, the fixing slot 1133a formed by the fixing portion 1133 is stuck on the side edge of each display panel 30, the sub-screen 90 is set on the side edge of the display panel 30 away from the light emitting surface, and the incident portion 1131 is attached to the surface of the sub-screen 90 to receive the emitted light and transmit it to the light emitting end 111. Here, the sub-screen 90 includes a sub-backlight module 93 and a sub-display panel 91. Of course, the back of the two spliced display panels 30 is also provided with a backlight module 70 to provide the light source for the desired display screen. The sub-display panel 91 and the spliced display screen of the two display panels 30 need to be integrated control to ensure the smooth splice of the screen, does not affect the screen display. The backlight module 70 includes a backlight source and a number of stacked optical control members, optical control members can be light guide, light gain or diffusion sheet, etc., so as to provide a more uniform and stable light source for the display panel 30. Here, the backlight source can be set on the side edge of the optical control member, i.e., the backlight module 70 is a side-entry backlight module; the backlight source can be set below the optical control member, i.e., the backlight module 70 is a straight-down backlight module.

Referring again to FIG. 11, based on the above embodiments, the splicing display device 100 further includes a support assembly 50, the support assembly 50 is provided on the surface of the display panel 30 away from the light emitting end 111, the incident end 113 passes through the two display panels 30 to fixedly connect to the support assembly 50.

It can be understood that in order to protect the display panel 30 and fix the display panel 30, the splicing display device 100 also includes a support assembly 50, which is provided on the surface of the display panel 30 away from the light emitting end 111, so as not to affect the display of the screen. When the splicing display device 100 is OLED, the incident end 113 passes through the splice position of the two display panels 30 and is directly connected to the support assembly 50. Here, the support assembly 50 may include two support members 51, each of which is connected to a display panel 30, and the fixing portion 1133 is connected to each of the two support members 51. The connection between the support member 51 and the display panel 30 can be bonded, as no light is required to pass through, the bonding member can be a transparent material or shading material, transparent material, for example, liquid glue such as resin glue or methanol glue, etc., or solid glue, which is convenient to connect and can reduce costs. The shading material for example, black and black double-sided adhesive, black and white double-sided adhesive or PET black double-sided adhesive, etc. And the fixing portion 1133 and the support member 51 can also be bonding, or plug, clamping connection, etc., which will not be limited herein. Of course, the plurality of support members 51 can also be an integrated structure, to facilitate processing, the hole is opened corresponding to the fixing portion 1133 for fixation.

Please refer to FIG. 13, on the basis of the above embodiment, when the splicing display device 100 is LCD, the support assembly 50 needs to fix the backlight module 70 in addition to the display panel 30, i.e., the backlight module 70 is installed on the support assembly 50, and the display panel 30 is located on the light emitting side of the backlight module 70 and fixed to the support assembly 50. Of course, the sub-screen 90 that provides light source to the optical splicing structure 10 also needs to be provided with a support assembly 50, which is connected to the back of the support assembly 50 of the display panel 30 for splicing, and is mounted with a sub-backlight module 93 and a sub-display panel 91, so as to provide light source for the incident end 113 that passes through the gap between the two spliced display panels 30 and the two support assemblies 50, and the specific structure can be set as needed.

The splicing display device 100 in the technical solution of the present application, due to the inclusion of the optical splicing structure 10, can effectively cover the black edges and concave at the splice position when targeting the splicing of the flexible display panel 30, and direct the light from the display area 31 of the display panel 30 to the light emitting end 111 to realize the display of the screen, to realize the effect of seamless splicing. Of course, when applied to a rigid LCD display device, it is sufficient to match the corresponding strip-shaped sub-screen 90.

The above mentioned is only a preferred embodiment of the present application, not to limit the scope of the present application. Any equivalent structural transformation made under the inventive concept of the present application using the specification of the present application and the contents of the attached drawings, or direct/indirect application in other related technical fields are included in the scope of the present application.

What is claimed is:

1. A splicing display device, comprises at least two display panels and an optical splicing structure, wherein the optical splicing structure is located at a splice position of two adjacent display panels, the light emitting end covers at least a non-display area of two display panels, wherein the optical splicing structure comprises:

a plastic sealing body comprising an incident end and a light emitting end opposite to the incident end; and an optical fiber bundle comprising a plurality of optical fiber lines distributed within the plastic sealing body, wherein the plurality of the optical fiber lines extend in an extension direction from the incident end to the light emitting end and are arranged in a direction perpendicular to the extension direction from the incident end to the light emitting end;

the splicing display device further comprises a support assembly, the support assembly is provided on a surface of the display panel away from the light emitting end, the incident end passes through the two display panels to fixedly connect to the support assembly.

2. The splicing display device according to claim 1, wherein the plastic sealing body comprises a main body and opaque particles filled within the main body.

3. The splicing display device according to claim 2, wherein the optical fiber lines are made of glass or organic fibers; and/or, the main body is made of acrylonitrile-butadiene-styrene plastic, UV-curable ink, polymethyl methacrylate or polycarbonate; and/or, the opaque particles are made of carbon black.

4. The splicing display device according to claim 1, wherein the optical fiber line is curved in the extension direction, an end of the optical fiber line at the incident end is perpendicular to an outer surface of the incident end, and the end of the optical fiber line at the light emitting end is perpendicular to a surface of the light emitting end.

5. The splicing display device according to claim 4, wherein the incident end comprises an incident portion and a fixing portion;

two incident portions are provided on two sides of the fixing portion respectively, each incident portion is provided in a concave arc; or, the fixing portion and the incident portion are arranged in the direction from the light emitting end to the incident end, the fixing portion is provided with two fixing slots that are away from each other, a line for connecting the two fixing slots is perpendicular to the direction from the light emitting end to the incident end, and a surface of the incident portion away from the fixing portion is flat.

6. The splicing display device according to claim 5, wherein the plurality of the optical fiber lines are symmetrical about a midline in a direction of their arrangement.

* * * * *